April 25, 1933.   M. J. HOFFMAN   1,905,288
KEY CONTROLLED PRINTING MACHINE
Filed June 23, 1931   2 Sheets-Sheet 1
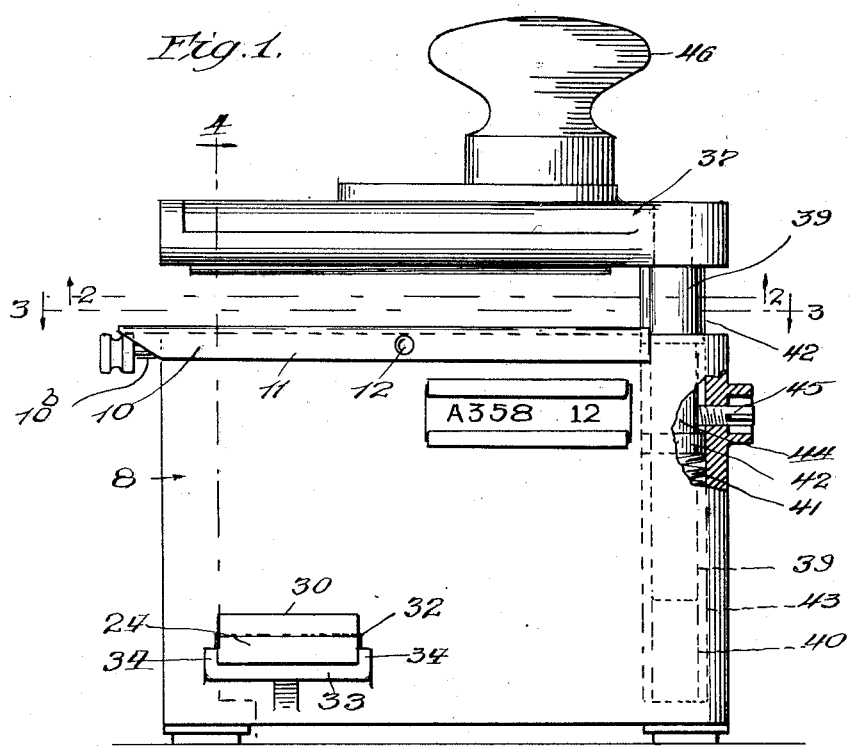
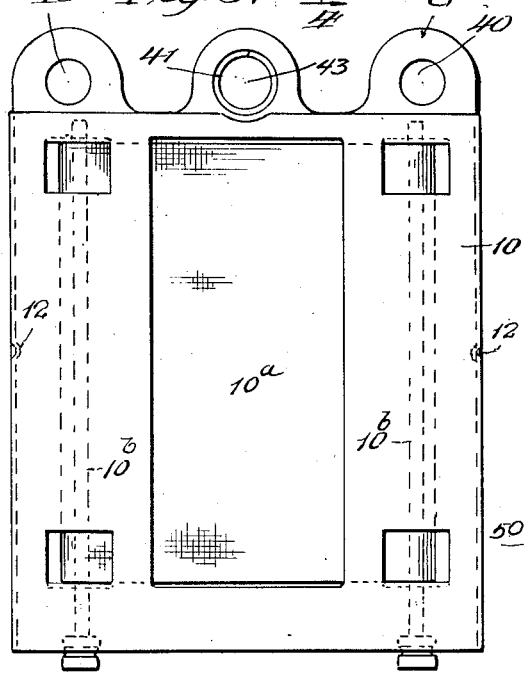
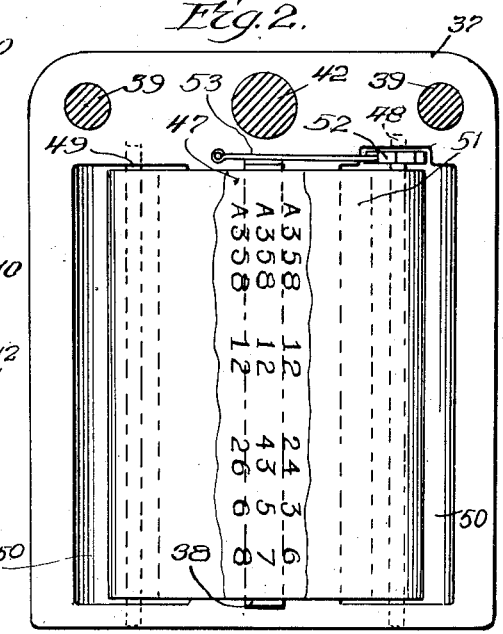
Inventor:
Morris J. Hoffman,
by Charles O. Hervey
his Atty.

April 25, 1933.  M. J. HOFFMAN  1,905,288
KEY CONTROLLED PRINTING MACHINE
Filed June 23, 1931    2 Sheets-Sheet 2
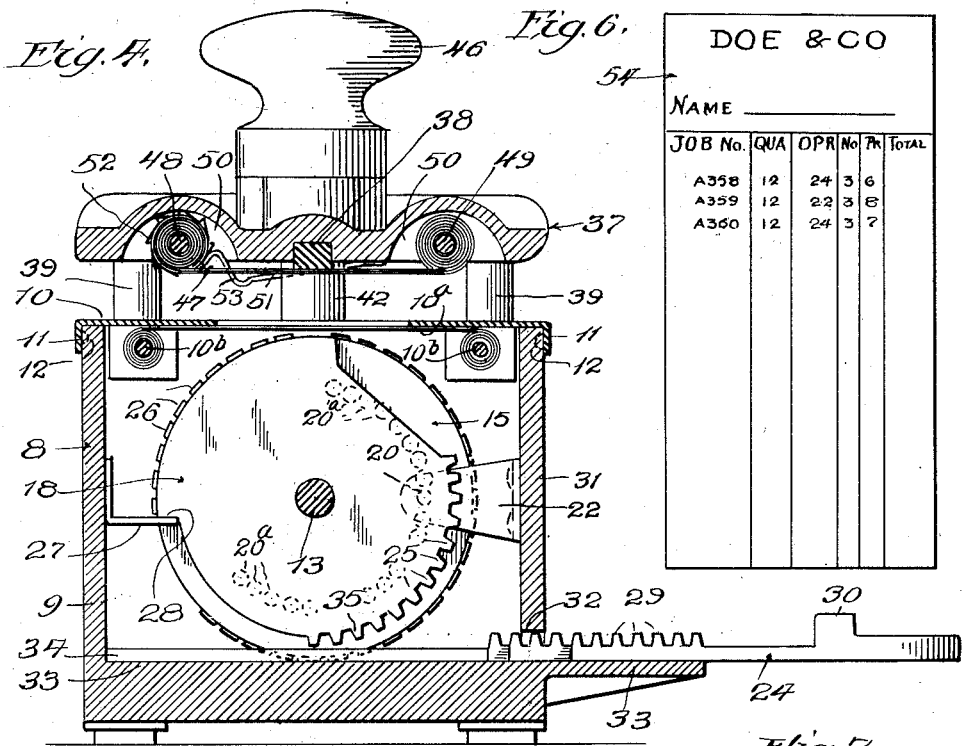
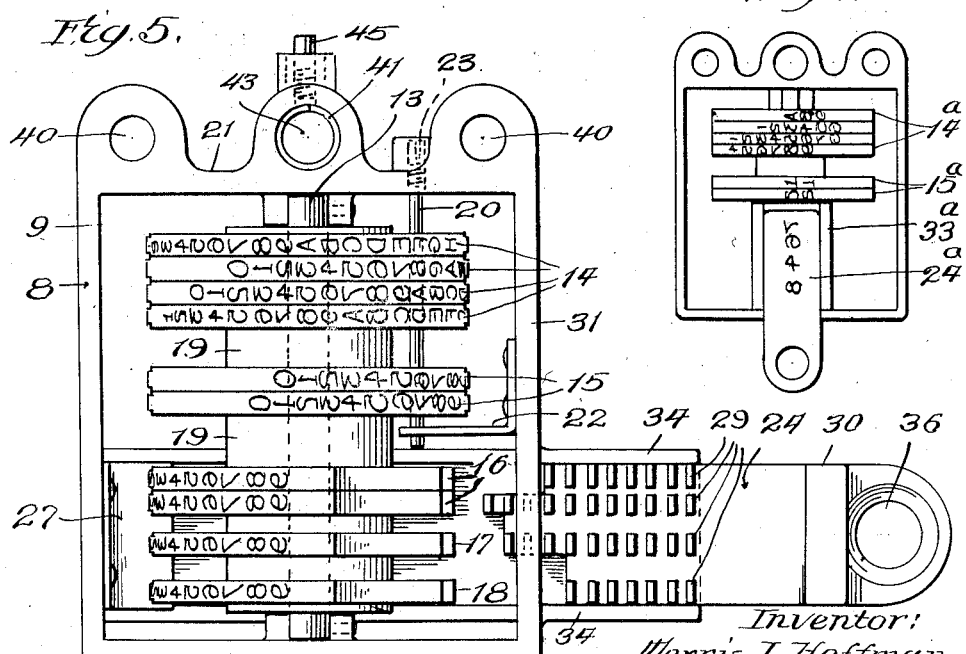

Patented Apr. 25, 1933

1,905,288

UNITED STATES PATENT OFFICE

MORRIS J. HOFFMAN, OF CHICAGO, ILLINOIS, ASSIGNOR TO THE TABULATING MACHINE COMPANY, OF NEW YORK, N. Y., A CORPORATION OF NEW JERSEY

KEY CONTROLLED PRINTING MACHINE

Application filed June 23, 1931. Serial No. 546,306.

This invention relates to key controlled printing machines, and its principal object is to provide a machine for printing data upon workmen's tickets or other cards and simultaneously making a duplicate record thereof on a record strip, whereby the workmen may be provided with a record of the work done by them and the wages due for such work, from which record the total wages may be readily ascertained and, at the same time, a check may be kept on the duplicate record for discovering any falsification of the workman's ticket or card.

In many establishments where great quantities of articles are manufactured, each workman has some particular labor to perform upon the articles manufactured and he is paid a certain price for this particular work. In cases where a definite number of a specified article are to be manufactured, the work is classified as a "job" and is given an identification or job number; the number of articles in the job must be accounted for, the character of the operations, the workmen's clock numbers or identification numbers, and the prices paid for the various operations must be credited upon each workman's ticket or card and a duplicate record kept of such notations. Inasmuch as several workmen may perform work upon a given lot of articles, the job number and quantity remain constant or fixed for that lot, but the workmen's operations upon the articles, the clock numbers or identification numbers of the workmen and the respective prices to be paid vary.

One of the objects of the present invention is to provide a printing machine in which the printed data which is constant or fixed for any given "job" may be set up in certain printing elements in the machine, and locked against access or manipulation by unauthorized persons, whereas the type members for printing operation numbers, the workmen's clock numbers, and the prices to be paid for such operations, are controlled by keys individually issued to and usually retained by the workmen. Each key, when inserted into the machine, sets up type members and completes a line of type by means of which data, such as the job number, the quantity, the operation number, the workman's clock number, and the specified price to be paid him for his work, may by printed upon his ticket or card and a duplicate of such data simultaneously printed upon a record strip. The object of this arrangement is to prevent dishonest persons from falsifying the records, and if, for instance, a workman should duplicate the data upon his ticket or card, it would be readily discovered on his card by a comparison of the same with the duplicate record strip.

With these and other objects and advantages in view, this invention consists in the several novel features hereinafter fully set forth and claimed.

The invention is clearly illustrated in the drawings accompanying this specification in which—

Figure 1 is a side elevation, partly broken out, of a key controlled printing machine embodying a simple form of the present invention;

Fig. 2 is a horizontal section taken on the line 2—2 of Fig. 1;

Fig 3 is a horizontal section taken on the line 3—3 of Fig. 1 with the impression making member removed;

Fig. 4 is a vertical cross section taken on the line 4—4 of Fig. 1;

Fig. 5 is a plan of the machine with a certain impression making member and ribbon supporting plate removed from the machine;

Fig. 6 is a face view of a workman's ticket or card used in connection with the machine; and Fig. 7 is a plan of a slightly modified form of the invention with the impression head and ribbon supporting plate removed from the machine.

Referring to said drawings, and first to Figs. 1 to 6, inclusive, the reference character 8 designates a base, here shown in the form of a case of rectangular form, provided with a chamber in which is contained certain of the printing mechanism of the machine. The base is open at its upper end and is closed by a ribbon supporting plate 10 which is detachably secured upon the upper open end of the base. The ribbon supporting plate 10 may be provided with flanges 11 on its side edges which overlap the side walls 9 and 31 of the base and are formed with indentations 12 that enter depressions in the side walls and detachably secure the ribbon supporting plate to the base.

Mounted on the end walls of the base is a shaft or spindle 13 upon which are rotatably mounted several sets of type members, here shown in the form of type disks, each of which is capable of being adjusted relative to the others so as to present any selected type face thereof in printing position. The set of type disks, designated by the reference character 14, are used for printing the job number or other identification number of any lot of articles which are to be manufactured, and the set indicated by the reference character 15 are used for printing the quantity or number of the articles in the lot, these two sets of type disks being provided with locking means for locking them in any selected position to thereby prevent unauthorized persons from manipulating them so as to print some other job number and quantity. Usually the person having charge of the machine is the only one authorized to set up the type disks of the two sets 14 and 15 into printing position.

The set of type disks designated by the reference character 16 prints the identification numbers of the several workmen's operations on the article manufactured, the type disk 17 prints the several workmen's clock numbers, and the type disk 18 prints the respective prices to be paid the several workmen for work performed upon the articles that make up a particular lot or job. Each of the type disks are provided upon their peripheries with type face for printing digits from 0 to 9, and, if desired, letters of the alphabet and other suitable characters. The several sets of type disks are spaced apart by washers 19 to locate the type disks in position to print in definite rows on the workman's ticket or card and on the duplicate record strip as will be presently explained.

Any suitable locking means may be provided for locking the sets of type wheels 14 and 15 in any selected printing position, and, in the drawings, I have illustrated a locking pin 20 which extends through an end wall 21 of the base, through apertures 20ª in the type disks 14 and 15 and through a bracket 22 supported upon the side wall 31 of the base. The pin 20 may be threadedly mounted in the end wall 21 and provided with an odd shaped end 23 adapted to receive an odd shaped socket key, whereby the pin 20 may be removed only by a person having the proper key to fit the odd shaped end of the pin. By withdrawing the pin, the sets 14 and 15 of the type disks are unlocked and the individual disks of said sets may thereupon be adjusted to present any selected type face thereof into printing position after which the pin is inserted and locked by the key and the key removed. With this, or any equivalent locking means for the sets 14 and 15 of the type disks, the latter are locked in place in selected position against unauthorized manipulation.

The type disks 16, 17 and 18, which are under the control of the several workmen, are not locked in place in the machine, but are capable of being manipulated by keys, one of which is shown at 24. The keys, if desired, may be retained by the workmen who insert them into the machine and set the type disks 16, 17 and 18 in selected printing positions to print the individual workman's operation number, his clock number, and the price to be paid him for his work.

In the form of key controlled printing means illustrated in the preferred form of the invention, the disks 16, 17 and 18 are provided throughout a portion of their peripheries with gear segments, the teeth 25 of which correspond in number and spacing to the number of type faces 26 and the spacing thereof on the peripheries of the type disks 16, 17 and 18, as is clearly shown in Fig. 4. Any suitable means may be provided for holding the type disks 16, 17 and 18 in neutral position, the means here shown comprising a bar 27 secured to the side wall 9 of the base and forming a ledge or stop for the type disks 16, 17 and 18, the latter being formed with shoulders 28 in their peripheries which encounter and rest upon the stop 27. Conveniently, the radius of the part of each disk on which the type faces 26 are formed is greater than the radius of the part on which the gear teeth 25 are formed; with this arrangement, the center of gravity of the disks is slightly to the left of the axis thereof, as viewed in Fig. 4. Consequently, the weight of the disks is so disposed that the parts thereof containing the type faces 26 rest upon the stop 27.

Each key 24 may be in the form of a flat plate provided with rack teeth 29 on one side thereof, as shown, there being one set of rack teeth for each type disk 16, 17 and 18, and each key is provided with a shoulder or other stop member 30 adapted to engage with the outer face of the side wall 31 of the base to stop the key at the proper place with respect to the type disks 16, 17 and 18 when inserted into the base. The teeth 29 of the several racks are aligned with each other, as seen in Fig. 5, and the length of each rack from the shoulder 30 determines the arcuate distance through which its associated type disk is rotated.

The side wall 31 is formed with a slot 32 through which the keys are inserted into the base, and below said slot is a guide bar 33 which extends underneath the type disks 16, 17 and 18 and serves to guide the keys 24 into intermeshing relation with the gear teeth 25 of the type disks 16, 17 and 18. The guide bar 33 extends outward beyond the side wall 31 for some distance to facilitate the insertion of the keys into the base. Side flanges 34 are provided upon the guide bar 33 for guiding the keys, so that the teeth thereof move in alignment with the gear teeth 25 of the type disks 16, 17 and 18. With this arrangement, the end teeth farthest removed from the stop member 30 of the key first engage the teeth of the gear segments marked 35, thereby bringing the remaining teeth on the key into intermeshing condition with the gear teeth of the type disks, and by pushing the key in until the stop member 30 encounters the side wall 31, the type disks are rotated through arcs determined by the number of teeth 29 of the key that are brought into mesh with the gear teeth 25. As a result, the type faces 26 selected by the key are moved into printing position.

The keys 24 are preferably in the form of blanks containing the total number of teeth required to rotate the type disks 16, 17 and 18 through their maximum extent of movement, and when a key is issued to any workman, the key is cut by a suitable die or other tool to leave the required number of teeth in each rack to set up the type disks 16, 17 and 18, and bring the selected type faces thereof into printing position. If desired, a key may be provided with a hole 36, whereby the key may be hung on a nail or other support.

Associated with the several type disks is a depressible head 37 which is movably mounted above the base and is arranged to be depressed to make an impression. On the underside of the head 37 is supported an impression bar 38 formed of rubber or other resilient material, which bar is located directly over the printing position of the type disks and co-operates with an ink ribbon 10$^a$ supported by the ribbon supporting plate 10 to make impression on the workman's ticket or card. The ink ribbon is wound upon rolls 10$^b$ carried by the plate 10, and the latter is formed with a central opening through which the impressions are made. The head 37 is guided to move vertically, and, as shown, is carried by two rods 39 which are slidably mounted in bored holes 40 formed in the base. The head 37 is spring pressed in an upward direction in a coiled compression spring 41 contained in a bored hole 43 and bearing against the lower end of a rod or stem 42 secured in the head 37 and entering the bored hole 43.

The head 37 is locked to the base against removal by unauthorized persons, and any suitable locking means may be provided for this purpose. As shown, the rod or stem 42 has a reduced or neck portion 44 at the end of which are shoulders formed by the unreduced parts of the rod. A pin 45 threadedly mounted in the rear wall 21 of the base enters the space between the shoulders of the rod 42 and forms a stop limiting the upward movement of the head 37. The outer end of the pin 45 may be provided with an odd shape for the reception of a socket key by means of which the pin may be unscrewed or screwed into place. The key is usually left with the person having charge of the machine who is the only authorized person to remove the head from the base in making adjustments or in removing the record strip, as will be presently explained. A knob 46 secured to the top of the head 33 provides means whereby the head may be struck down to make the impression.

The head 37 besides carrying the impression making bar 38 supports a record strip 47 upon which duplicate records are made of the data printed upon the workmen's tickets or cards. The record strip 47 is wound upon two rolls 48 and 49 which are journaled in the head 37, and the latter is formed with two upwardly recessed parts 50 which provide spaces to receive the rolls of the record strip.

Associated with the record strip is a strip of carbon paper 51 which co-operates with the type disks to make the impression upon the record strip 47. Means may be provided for automatically winding the record strip from one roll to the other, and, for this purpose, a ratchet wheel 52 is provided upon one end of the roll 48 and a spring pawl 53 is secured upon the lower side of the head 37, which pawl engages with the teeth of the ratchet wheel 52. The pawl projects down below the lower face of the head and engages the ribbon supporting plate 10 when the head is depressed, thereby bringing the end of the pawl into engagement with the next adjacent tooth of the ratchet wheel, the spring tension of the pawl serving to move the ratchet wheel one step when the head is returned to its upper position, thus advancing the record strip one step each time the machine is operated.

In Fig. 6 is illustrated a suggested form of workman's ticket or card 54, ruled to provide columns to receive the data printed by the machine. At the head of the column may be printed "Job No., Qua. (quantity), Opr. (operation), No. (clock number), Pr. (price), and Total." This card also illustrates several records which have been made thereon by the machine.

In the operation of the machine, the attendant adjusts the two sets 14 and 15 of the type disks to bring into position the characters thereon that indicate the job number of the lot of articles which are to be manufactured and the quantity or number of such articles, and locks these sets of type disks against unauthorized manipulation. A roll of record strip is also inserted in the head 37, and the head is thereupon locked to the base to prevent unauthorized removal.

Tickets 54 are issued to the workmen who perform labor on the lot of articles which are identified by the job number and quantity set up by the sets 14 and 15 of the type disks. A key is issued to each workman who performs labor on this lot of articles, such key being individual to each workman and being formed with the proper number of rack teeth to actuate the type disks 16, 17 and 18 to bring the proper type faces thereof into printing position to print the identification number of the individual workman's operation on the articles, his clock number, and the price which is to be paid to him for the labor performed.

To make a record upon the ticket or card, the workman or the attendant, as the case may be, places the card with the printed face down upon the top of the ribbon frame 10, inserts the key 24 into the machine bringing the stop member 30 up against the outer face of the wall 31 of the machine. The rack teeth of the key are thus brought into mesh with the gear teeth 25 of the type disks 16, 17 and 18 and partially rotate said type wheels, bringing the selected type faces 26 into printing position, the arcuate distance which said type wheels are moved being determined by the number of teeth which are meshed with the gear teeth of the type disks.

The workman or attendant, as the case may be, imparts a blow to the knob 46, striking the head 37 down and making an impression of the type faces, which are in printing position, upon the lower side of the ticket and upon the record strip. The head being released, the spring 41 returns it to its normal or upper position and the pawl 53 during said upward movement advances the record strip one step bringing it into position to receive the next impression. The ticket or card is removed and the workman withdraws his key, thereby returning the type disks 16, 17 and 18 back to their normal neutral position.

It is to be understood that one of the machines accompanies each job and makes records for the workmen of their labor upon the articles and the prices that they are to be paid for their labor. On the side of the base may be provided a slideway for receiving a card bearing the job number and quantity of articles in the particular lot in connection with which the machine is used. It also makes a duplicate on a single record strip of all of the data printed on the workmen's tickets or cards. In this manner accurate records are kept which cannot readily be falsified. These records make it a comparatively simple matter to observe whether there has been any falsification on the workman's ticket or card and also simplifies the work of calculating the amount due to the several workmen for their labor.

It is further to be observed that the machine provides selectively adjustable type members which are locked in place in the machine against tampering by unauthorized persons, and also provides type members, the printing positions of which are controlled by keys individual to the workmen, whereby each workman may readily set the type numbers in the machine for printing the data pertaining to that individual workman in connection with the data which is printed by the type characters fixed in the machine.

In the modified form illustrated in Fig. 7, the several parts corresponding to the fixed type disks, the impression making device and record strip are substantially the same as that of the preferred form. Instead of using type disks for printing the data individual to the workman, type keys 24ª are used in place thereof. Said keys themselves bear type faces for printing the identification number of the operation performed by the workman, his clock number and the price paid him. The machine is provided with a guide member 33ª located adjacent the top of the base, into which guide member the workman inserts the key 24ª bringing the type faces thereof into printing position in line with the type faces set up by the fixed or locked type disks 14ª and 15ª. With this arrangement, the attendant exclusively controls the fixed type disks while the workmen with their individual keys control the printing of the data individual to the workman.

More or less variation of the exact details of construction is possible without departing from the spirit of this invention. I desire, therefore, not to limit myself to the exact form of the construction shown and described, but intend, in the following claims to point out all of the invention disclosed herein.

I claim as new, and desire to secure by Letters Patent:

1. A key controlled printing machine comprising in combination type members having type faces thereon for printing fixed data, said type members being locked against unauthorized manipulation in selected printing position, workmen's keys and other type members cooperating with said keys and bearing type faces selectively controlled and operated by said workmen's keys for printing data in connection with the fixed data printed by said locked type members.

2. A key controlled printing machine comprising in combination a base, a series of type members, each having type faces thereon for printing fixed data, said type members being adjustable whereby any selected type face thereof may be brought into printing position, locking means for locking said type members in the base against unauthorized manipulation, workmen's keys, and other type members cooperating with said keys and bearing type faces and individually controlled and operated by said workmen's keys and adapted to print data individual to the workman in connection with fixed data printed by the locked type members.

3. A key controlled printing machine combrising in combination a base, type members having type faces thereon for printing fixed data and locked in fixed printing position in said base, keys individual to workmen and insertable into said base, and key operated type members capable of being selectively moved to printing position by said keys, whereby to print individual data in connection with the fixed data printed by the locked printing members.

4. A key controlled printing machine comprising a base, a series of adjustable type disks rotatably mounted in said base and locked therein against unauthorized manipulation, a second series of adjustable type disks rotatably mounted in the base, and a key having means thereon selectively engaging the type disks of the second series and adapted to set said type disks in selected printing positions.

5. In a printing machine, the combination of a base, a series of adjustable type disks locked in said base against unauthorized manipulation, a second series of adjustable type disks, each of which is provided with a gear segment, a key having rack teeth thereon adapted to mesh with the teeth of the gear segments, and a stop member for limiting the inserting movement of the key.

6. A key controlled printing machine comprising in combination a base, a series of type disks rotatably mounted therein and each selectively adjustable, means for locking said series of type disks against unauthorized manipulation, a second series of type disks rotatably mounted in said base and each provided with type faces disposed about a portion of its periphery and also provided with a gear segment disposed about another portion of its periphery, means for holding the type disks of the second series in neutral position, a key having rack teeth thereon individual to the gear segments of the type disks of said second series, and a stop member for limiting the inserting movement of the key.

7. In a printing machine, the combination of a base, a series of adjustable type disks mounted therein and locked against unauthorized manipulation, a second series of type disks mounted in said base for rotation therein, means for holding the type disks of the second series in neutral position, a key insertable into said base and having a stop member for limiting its inserting movement, and complemental means on the type disks of the second series and the key for transmitting motion from the key to said type disks.

8. In a machine of the class described, the combination of a base, a series of adjustable type disks rotatably mounted therein and each selectively adjustable, key controlled locking means for locking said type disks against unauthorized manipulation, and a key insertable into said base and having type faces thereon for printing data in connection with the data printed by the type disks.

9. A key controlled printing machine comprising in combination a base, adjustable type disks rotatably mounted in said base and key locked therein against unauthorized manipulation, a second series of type disks rotatably mounted in said base, workmen's keys, key actuated means for selectively moving said type disks of the second series to printing position selected by said key, a head movably mounted on said base, and a record strip upon which a duplicate record is made of the data printed by said type disks.

10. A key controlled printing machine comprising in combination a base, adjustable type disks rotatably mounted in said base and key locked therein against unauthorized manipulation, a second series of type disks rotatably mounted in said base, workmen's keys, key actuated means for selectively moving said type disks of the second series to selected printing positions, a head mounted upon said base and provided with an impression making bar, and a record strip carried by said head adapted to receive duplicate impressions of the data printed by said type disks.

11. A key controlled printing machine comprising in combination a base, fixed printing disks and key actuated printed disks mounted therein, a head movably mounted on said base, and a record strip carried by said head and adapted to receive duplicate impressions of the data printed by said type disks.

12. A key controlled printing machine comprising in combination a base, fixed type disks lockingly secured in said base, key actuated type disks mounted in the base, a head movably mounted on the base and provided with an impression making bar, a record strip carried by said head, and means for advancing the record strip.

13. A key controlled printing machine comprising in combination a base, fixed data printing means key locked therein against unauthorized access and separate printing means individual to the workman and including a key insertable into said base and co-operating with said fixed data printing means to print the combined fixed data and individual data.

14. A key controlled printing machine comprising in combination a base, fixed data printing means key locked therein against unauthorized access, separate printing means individual to workmen, and including a key insertable into said base and co-operating with said fixed data printing means to print the combined fixed data and individual data on a card, and a record strip carried by the machine on which duplicate copies of said combined data are printed.

15. A key controlled printing machine comprising in combination a base, fixed data printing means locked therein against unauthorized manipulation, variable printing means in said base, and keys individual to the workmen and insertable into said base, said variable printing means and keys having complemental elements, whereby the keys move said variable printing means to selected printing position.

16. A key controlled printing machine comprising in combination a base, fixed data printing means locked therein against unauthorized manipulation, variable printing means in said base, keys individual to the workmen and insertable into said base, said variable printing means and keys having complemental elements, whereby said keys move said variable printing means to selected printing position, and a record strip carried by the machine upon which duplicate copies are made of the data printed by said fixed and variable printing means.

17. A key controlled printing machine comprising in combination a base, fixed data printing means key locked therein against unauthorized manipulation, and separate printing means individual to workmen and including a key on which the separate printing means is contained, said key being insertable into said base to bring the printing means thereof into association with the fixed printing means, whereby to print the combined fixed data and the data individual to the workmen.

18. A key controlled printing machine comprising in combination a base, fixed data printing means key locked therein against unauthorized manipulation, separate printing means individual to workmen and including a key on which the separate printing means is contained, said key being insertable into said base to bring the printing means thereof into association with the fixed printing means, whereby to print the combined fixed data and the data individual to the workmen on a card, and a record strip carried by the machine on which duplicate copies of said combined data are printed.

19. A key controlled record making machine comprising in combination a support, selectable record making elements key locked therein against unauthorized manipulation, and separate selectable record making elements controlled by a removable key, individual to the workman and insertable into said support, and combining with the first mentioned record making elements to produce a joint record.

20. A key controlled record making machine comprising in combination a support, selectable record making elements key locked therein against unauthorized manipulation, separate selectable record making elements controlled by a removable key, individual to the workman and insertable into said support, and combining with the first mentioned record making elements to produce a joint record, and a permanent record strip upon which a duplicate of said joint record is simultaneously made.

MORRIS J. HOFFMAN.